(12) United States Patent
Roh et al.

(10) Patent No.: US 10,593,322 B2
(45) Date of Patent: Mar. 17, 2020

(54) ELECTRONIC DEVICE AND METHOD FOR CONTROLLING THE SAME

(71) Applicant: LG ELECTRONICS INC., Seoul (KR)

(72) Inventors: Sibong Roh, Seoul (KR); Taeho Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/877,275

(22) Filed: Jan. 22, 2018

(65) Prior Publication Data

US 2019/0057684 A1 Feb. 21, 2019

(30) Foreign Application Priority Data

Aug. 17, 2017 (KR) .......................... 10-2017-0104238

(51) Int. Cl.
*G10L 15/16* (2006.01)
*G10L 15/30* (2013.01)
(Continued)

(52) U.S. Cl.
CPC .............. *G10L 15/16* (2013.01); *G06F 3/167* (2013.01); *G10L 15/22* (2013.01); *G10L 15/30* (2013.01);
(Continued)

(58) Field of Classification Search
CPC ....... A61B 5/0476; A61H 23/02; G06F 3/165; G06F 13/4291; G06F 17/30864; G06F 3/167; G06F 3/16; G06F 13/42; G06F 17/28; G06F 17/30; G06F 1/00; G06F 3/0484; G06Q 10/087; G06Q 10/20; G06Q 20/0855; G06Q 10/00; G06Q 20/08; G06Q 10/10; G08G 1/01; G06T 19/00; G06T 19/006; G10L 15/16; G10L 15/18; G10L 15/1822; G10L 15/22; G10L 15/24;
(Continued)

(56) References Cited

U.S. PATENT DOCUMENTS 4,677,569 A * 6/1987 Nakano ..................... G06F 3/16
704/275
5,239,586 A * 8/1993 Marui ................... H04M 1/271
379/354

(Continued)

*Primary Examiner* — Gerald Gauthier
(74) *Attorney, Agent, or Firm* — Lee, Hong, Degerman, Kang & Waimey PC

(57) ABSTRACT

An electronic device which can communicate with a plurality of artificial intelligence servers includes a voice receiving unit receiving a voice, a wireless communication unit communicating with a plurality of artificial intelligence servers set to be activated by mutually different starting words, and a controller generating a plurality of starting words set to be different respectively for the plurality of artificial intelligence servers in response to an input voice including a preset starting word, converting the voice t include the plurality of generated starting words and transmitting the converted voice to each of the plurality of artificial intelligence servers, and outputting a plurality of pieces of result information when the plurality of pieces of result information generated in response to the converted voice are received from the plurality of artificial intelligence servers.

19 Claims, 14 Drawing Sheets

(51) Int. Cl.
*G10L 15/22* (2006.01)
*G06F 3/16* (2006.01)
*G06N 3/08* (2006.01)
*G10L 15/08* (2006.01)
*G06N 3/04* (2006.01)

(52) U.S. Cl.
CPC ............... *G06N 3/04* (2013.01); *G06N 3/08* (2013.01); *G10L 2015/088* (2013.01); *G10L 2015/223* (2013.01)

(58) Field of Classification Search
CPC ............ G10L 15/30; G10L 2015/088; G10L 2015/223; G10L 17/24; G10L 17/22; G11B 27/22; H04L 65/1069; H04L 67/32; H04L 29/08; H04L 29/06; H04W 4/08; H04W 72/06; H05B 37/0236; H05B 37/02; A45B 25/16; G06N 3/04; G06N 3/0454; G06N 3/08; G06N 99/005; G06N 99/00; G06N 3/063; G06N 5/02; G06N 5/04; H04M 1/21; G06K 19/00; B63B 17/02; B60W 50/04; G05D 1/00; H04B 7/00
USPC ........ 341/176; 455/3.04, 566; 704/232, 234, 704/270, 275, 235, 260; 706/46, 11, 50; 709/202, 206, 223, 226; 702/184; 348/36; 379/265.09; 382/158; 700/90; 713/340
See application file for complete search history.

(56) References Cited

U.S. PATENT DOCUMENTS

| | | | | |
|---|---|---|---|---|
| 5,241,649 | A * | 8/1993 | Niyada | G10L 15/10 704/234 |
| 9,754,221 | B1 * | 9/2017 | Nagaraja | G06N 3/0454 |
| 9,839,267 | B1 * | 12/2017 | Gharabegian | A45B 25/16 |
| 9,961,516 | B1 * | 5/2018 | Proctor | H04W 4/10 |
| 9,996,819 | B1 * | 6/2018 | Modi | G06Q 10/087 |
| 10,334,921 | B2 * | 7/2019 | Gharabegian | A45B 25/16 |
| 10,459,440 | B2 * | 10/2019 | Rust | G05D 1/0287 |
| 2002/0032591 | A1 * | 3/2002 | Mahaffy | G07F 9/02 709/202 |
| 2003/0005107 | A1 * | 1/2003 | Dulberg | G06F 9/54 709/223 |
| 2005/0165609 | A1 * | 7/2005 | Zuberec | G10L 15/22 704/270 |
| 2006/0161394 | A1 * | 7/2006 | Dulberg | G06F 11/0748 702/184 |
| 2007/0293274 | A1 * | 12/2007 | Gieseke | H04M 1/72522 455/566 |
| 2008/0126095 | A1 * | 5/2008 | Sideman | G06F 3/167 704/260 |
| 2008/0139112 | A1 * | 6/2008 | Sampath | G06F 17/30867 455/3.04 |
| 2009/0099995 | A1 * | 4/2009 | Tzeng | H04L 67/22 706/50 |
| 2009/0245500 | A1 * | 10/2009 | Wampler | H04M 3/42382 379/265.09 |
| 2010/0009720 | A1 * | 1/2010 | Cha | G06F 1/1624 455/566 |
| 2010/0204989 | A1 * | 8/2010 | Boes | G10L 15/285 704/235 |
| 2011/0254723 | A1 * | 10/2011 | Tsurumoto | G08C 17/00 341/176 |
| 2013/0063550 | A1 * | 3/2013 | Ritchey | G16H 40/63 348/36 |
| 2014/0046891 | A1 * | 2/2014 | Banas | G06N 5/022 706/46 |
| 2015/0049938 | A1 * | 2/2015 | Han | G06T 1/20 382/158 |
| 2015/0081802 | A1 * | 3/2015 | Borenstein | H04L 51/04 709/206 |
| 2015/0112461 | A1 * | 4/2015 | Buckley | E02B 15/06 700/90 |
| 2015/0302303 | A1 * | 10/2015 | Hakim | G06Q 10/063 706/11 |
| 2016/0347326 | A1 * | 12/2016 | Iwagami | B60W 10/06 |
| 2017/0076212 | A1 * | 3/2017 | Shams | G06N 5/022 |
| 2017/0132581 | A1 * | 5/2017 | Roman | G06Q 50/22 |
| 2017/0213128 | A1 * | 7/2017 | Hammond | G06F 8/31 |
| 2017/0243136 | A1 * | 8/2017 | Ho Kang | H04L 51/046 |
| 2017/0270916 | A1 * | 9/2017 | Prokhorov | G10L 15/1822 |
| 2017/0287492 | A1 * | 10/2017 | Stewart | G10L 17/24 |
| 2017/0367606 | A1 * | 12/2017 | Lee | A63B 69/04 |
| 2018/0005631 | A1 * | 1/2018 | Lee | G10L 15/30 |
| 2018/0032305 | A1 * | 2/2018 | Cameron | G06F 3/165 |
| 2018/0040324 | A1 * | 2/2018 | Wilberding | G10L 15/30 |
| 2018/0047391 | A1 * | 2/2018 | Baik | G10L 15/22 |
| 2018/0075738 | A1 * | 3/2018 | Van Egmond | G06F 21/44 |
| 2018/0096302 | A1 * | 4/2018 | Tseretopoulos | G06Q 10/10 |
| 2018/0097910 | A1 * | 4/2018 | D'Agostino | H04L 67/32 |
| 2018/0108351 | A1 * | 4/2018 | Beckhardt | G10L 15/32 |
| 2018/0133101 | A1 * | 5/2018 | Inada | G10L 15/265 |
| 2018/0144255 | A1 * | 5/2018 | Shams | G10L 15/22 |
| 2018/0166103 | A1 * | 6/2018 | Wang | G11B 27/22 |
| 2018/0181656 | A1 * | 6/2018 | Proctor | H04W 4/10 |
| 2018/0184257 | A1 * | 6/2018 | Proctor | H04W 4/08 |
| 2018/0186433 | A1 * | 7/2018 | Gharabegian | B63B 17/02 |
| 2018/0196776 | A1 * | 7/2018 | Hershko | G06F 13/4291 |
| 2018/0204382 | A1 * | 7/2018 | Simpson | G06T 19/006 |
| 2018/0228006 | A1 * | 8/2018 | Baker | H05B 37/0236 |
| 2018/0247648 | A1 * | 8/2018 | Nadimpalli | G10L 15/22 |
| 2018/0260692 | A1 * | 9/2018 | Nagaraja | G06N 3/063 |
| 2018/0260700 | A1 * | 9/2018 | Nagaraja | G06N 3/0454 |
| 2018/0268384 | A1 * | 9/2018 | Jung | G06Q 20/0855 |
| 2018/0277113 | A1 * | 9/2018 | Hartung | G10L 15/22 |
| 2018/0286403 | A1 * | 10/2018 | Gruber | G10L 15/24 |
| 2018/0288104 | A1 * | 10/2018 | Padilla | H04L 65/1069 |
| 2018/0301147 | A1 * | 10/2018 | Kim | G10L 15/22 |
| 2018/0301151 | A1 * | 10/2018 | Mont-Reynaud | G06F 3/167 |
| 2018/0314942 | A1 * | 11/2018 | Shinn | G06F 17/2785 |
| 2018/0332154 | A1 * | 11/2018 | Gharabegian | H04M 1/21 |
| 2018/0336886 | A1 * | 11/2018 | Sun | G10L 15/16 |
| 2018/0349793 | A1 * | 12/2018 | Triolo | G06F 3/0481 |
| 2018/0357225 | A1 * | 12/2018 | Liu | G06F 17/279 |
| 2019/0014643 | A1 * | 1/2019 | Gharabegian | H05B 37/0236 |
| 2019/0042574 | A1 * | 2/2019 | Kim | G06K 9/6254 |
| 2019/0057684 | A1 * | 2/2019 | Roh | G10L 15/16 |
| 2019/0318740 | A1 * | 10/2019 | Takiguchi | G06F 16/90332 |

* cited by examiner

ELECTRONIC DEVICE AND METHOD FOR CONTROLLING THE SAME

CROSS-REFERENCE TO RELATED APPLICATION

Pursuant to 35 U.S.C. § 119(a), this application claims the benefit of earlier filing date and right of priority to Korean Patent Application No. 10-2017-0104238, filed on Aug. 17, 2017, the contents of which are hereby incorporated by reference herein in its entirety.

BACKGROUND OF THE INVENTION

1. Field of the Invention

The present disclosure relates to an electronic device capable of communicating with a plurality of artificial intelligence servers.

2. Background of the Invention

Recently, in line with the advancement of hardware, artificial intelligence technologies implementing humans' thinking process, i.e., perception, inference, learning, and the like, by computing techniques has been remarkably developed.

The artificial intelligence technologies, a research target itself, may be directly or indirectly associated with other fields of computer science to provide various functions. In particular, attempts to introduce artificial intelligent factors to various fields of information technologies to utilize in solutions of the fields have been actively made.

Artificial intelligence technologies are classified as strong artificial intelligence and weak artificial intelligence. The strong artificial intelligence is a technical scheme of thinking similar to human's and making decisions, which at a level of learning and deciding itself. The weak artificial intelligence is a technical scheme of providing an optimal solution by performing a recognition process such as perception, inference, and the like, through a calculation model.

As part of such technical development, attempts to apply artificial intelligence technologies to terminals most familiar to users to provide various functions have been increased.

Electronic devices (or terminals) may be generally classified as mobile/portable terminals or stationary terminals according to their mobility. Mobile terminals may also be classified as handheld terminals or vehicle mounted terminals according to whether or not a user can directly carry the terminal.

Currently, terminals are implemented to process information based on artificial intelligence technologies by utilizing an artificial intelligence server processing information through artificial intelligence technologies.

Meanwhile, artificial intelligence servers processing information though such artificial intelligence technologies are configured to process information by various algorithms by manufactures providing servers. Thus, there is a difference in information processing abilities of servers depending on types of artificial intelligence algorithms or an amount of information learned by servers.

However, currently, terminals are configured to perform communication only with a single artificial intelligence server which processes information through the artificial intelligence technologies. Thus, in case where information that a specific artificial intelligence server has not learned is requested to be processed, the artificial intelligence server may provide inaccurate information processing result.

SUMMARY OF THE INVENTION

Therefore, an aspect of the detailed description is to enhance accuracy of information processing through communication with a plurality of artificial intelligence servers which process information through artificial intelligence technologies.

Another aspect of the detailed description is to provide a method for driving a plurality of artificial intelligence servers, which are driven by different starting words, using a single starting word.

Another aspect of the detailed description is to provide result information of an artificial intelligence server having a highest level of accuracy, among a plurality of artificial intelligence servers, to a user.

To achieve these and other advantages and in accordance with the purpose of this specification, as embodied and broadly described herein, an electronic device including: a voice receiving unit receiving a voice; a wireless communication unit communicating with a plurality of artificial intelligence servers set to be activated by mutually different starting words; and a controller generating a plurality of starting words set to be different respectively for the plurality of artificial intelligence servers in response to an input voice including a preset starting word, converting the voice t include the plurality of generated starting words and transmitting the converted voice to each of the plurality of artificial intelligence servers, and outputting a plurality of pieces of result information when the plurality of pieces of result information generated in response to the converted voice are received from the plurality of artificial intelligence servers.

In an embodiment, the controller may search for a plurality of artificial intelligence servers which can be connected for communication through the wireless communication unit, and generates a network node corresponding to each of the plurality of artificial intelligence servers such that the electronic device can communicate with the plurality of artificial intelligence servers.

In an embodiment, when the communication node is generated in the plurality of artificial intelligence servers, the controller may receive information of starting words set to be different and registration information of the plurality of artificial intelligence servers from the plurality of artificial intelligence servers, and register the received starting word and registration information in the communication node of each server.

In an embodiment, when a communication node regarding each of the plurality of artificial intelligence servers is generated, the controller may transmit a question list including a plurality of questions as items to the plurality of artificial intelligence servers, and when answer information generated in response to the question list is received from the plurality of artificial intelligence servers, the controller may calculate an evaluation score regarding each of the plurality of artificial intelligence servers and determine priority levels of the plurality of artificial intelligence servers on the basis of the calculated evaluation scores.

In an embodiment, the controller may sequentially output a plurality of pieces of result information according to the determined priority levels.

In an embodiment, the controller may determine whether the answer information corresponds to any one of a positive answer and a negative answer, and calculate an evaluation score of a corresponding artificial intelligence server which has transmitted the answer information.

In an embodiment, when the answer information is not classified as a positive answer and a negative answer, the controller may determine the answer information as an ambiguous answer and store the number of times that a corresponding server has transmitted the ambiguous answer.

In an embodiment, when at least two artificial intelligence servers have the same evaluation score, the controller may set an artificial intelligence server whose number of times of transmitting the ambiguous answer is smaller, to have a higher priority level.

In an embodiment, after the plurality of pieces of received result information are output, when a new user voice is received through the voice receiving unit, the controller may determine whether the new user voice is related to the plurality of pieces of result information, and when the new user voice is related to the plurality of pieces of result information according to a determination result, the controller may update the evaluation score regarding the plurality of artificial intelligence servers on the basis of the new user voice.

In an embodiment, when the new user voice is not related to the plurality of pieces of result information, the controller may terminate the voice recognition function.

In an embodiment, when some of pieces of result information having a high priority level, among the plurality of pieces of result information, are output, if a user control command for outputting the other remaining pieces of result information than the some pieces of result information is received, the controller may output the other remaining pieces of result information in response to the received user control command.

In an embodiment, after the plurality of pieces of result information are output, when a new voice related to specific result information, among the plurality of pieces of result information, is received, the controller may transmit voice information corresponding to the new voice to only an artificial intelligence server which has transmitted the specific result information.

In an embodiment, when a preset starting word is a starting word set in a specific artificial intelligence server, the controller may transmit the voice only to the specific server.

In an embodiment, the controller may combine identification information of artificial intelligence servers which have transmitted result information to each of the result information transmitted from the plurality of artificial intelligence servers, and output the same.

To achieve these and other advantages and in accordance with the purpose of this specification, as embodied and broadly described herein, a method for controlling an electronic device which can communicate with a plurality of artificial intelligence servers, including: receiving a voice including a preset starting word; generating a plurality of starting words set to be different for each of the plurality of artificial intelligence servers on the basis of the preset starting word; converting the voice to include the plurality of starting words; transmitting the converted voice to the plurality of artificial intelligence servers; and when a plurality of pieces of result information generated in response to the converted voice is received from the plurality of artificial intelligence servers, outputting the plurality of pieces of result information.

Further scope of applicability of the present application will become more apparent from the detailed description given hereinafter. However, it should be understood that the detailed description and specific examples, while indicating preferred embodiments of the invention, are given by way of illustration only, since various changes and modifications within the scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Figure 1:
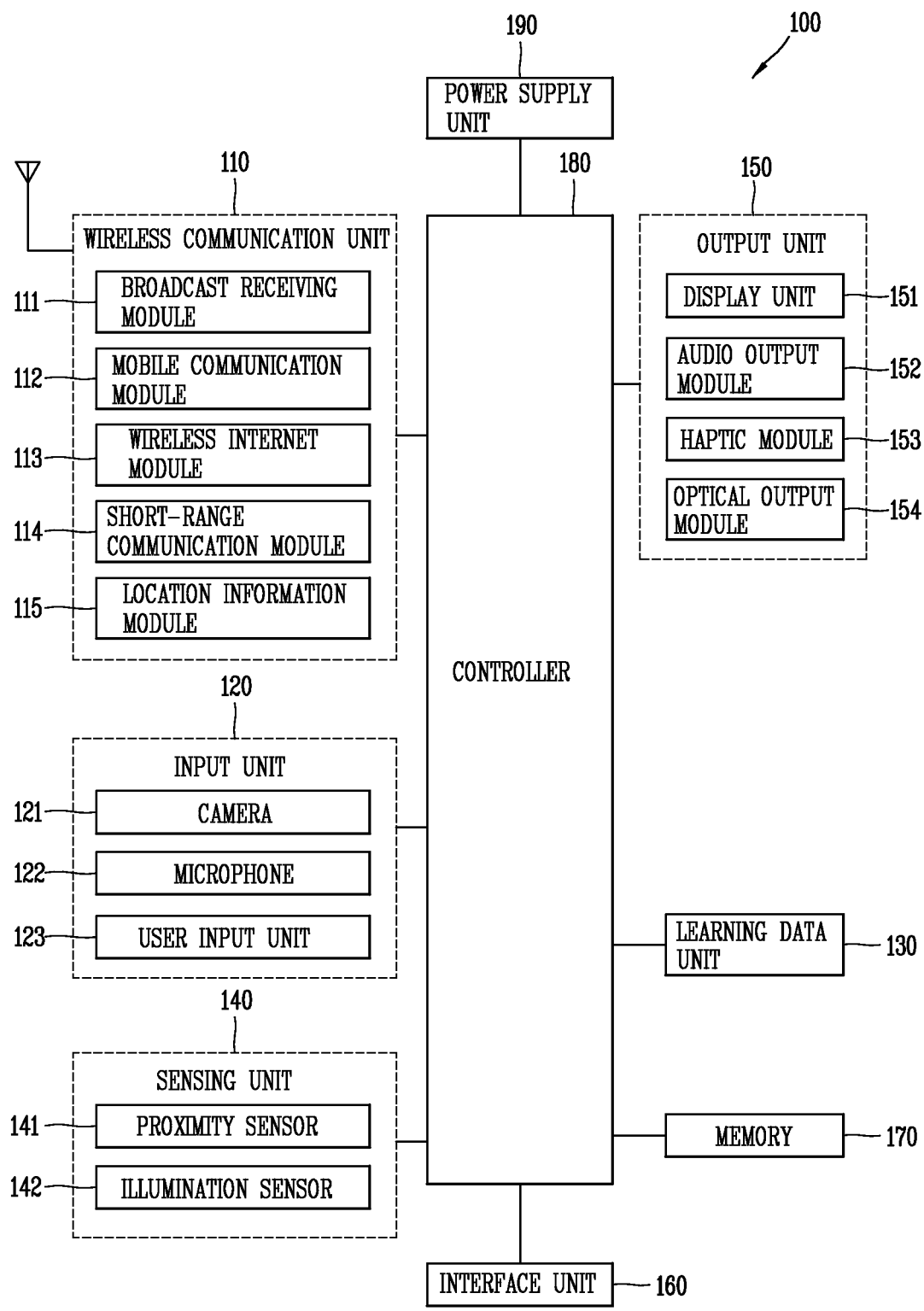
FIG. 1 is a block diagram illustrating an electronic device related to the present disclosure.

Description will now be given in detail of the exemplary embodiments, with reference to the accompanying drawings. For the sake of brief description with reference to the drawings, the same or equivalent components will be provided with the same reference numbers, and description thereof will not be repeated. A suffix "module" or "unit" used for constituent elements disclosed in the following description is merely intended for easy description of the specification, and the suffix itself does not give any special meaning or function. In describing the present invention, if a detailed explanation for a related known function or construction is considered to unnecessarily divert the gist of the present disclosure, such explanation has been omitted but would be understood by those skilled in the art. The accompanying drawings are used to help easily understood the technical idea of the present invention and it should be understood that the idea of the present disclosure is not limited by the accompanying drawings. In the following description, explanations will be made in order in the clockwise direction based on the drawing in a right upper side.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, digital signage, and the like.

Reference is now made to FIG. 1, where FIG. 1 is a block diagram of a mobile terminal in accordance with the present disclosure.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least some of the above components may operate in a cooperating manner, so as to implement an operation or a control method of a glass type terminal according to various embodiments to be explained later. The operation or the control method of the glass type terminal may be implemented on the glass type terminal by driving at least one application program stored in the memory 170.

Referring still to FIG. 1, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The learning data unit 130 may include a memory integrated to or provided in a mobile terminal. In an embodiment, the learning data unit 130 may be implemented through the memory 170. However, without being limited thereto, the learning data unit 130 may be implemented in a memory (e.g., an external memory connected to the mobile terminal 100) related to the mobile terminal or may be implemented through a memory included in a server which can communicate with the mobile terminal 100. In another embodiment, the learning data unit 130 may be implemented through a memory maintained in a cloud computing environment or another remote memory accessible by a terminal through the same communication scheme as that of a network.

In order to identify, index, classify, manipulate, store, search, and output data used in generally supervised or unsupervised leaning, data mining, prediction analysis, or another machine learning technology, the learning data unit 130 is configured to store the data in at least one database. Information stored in the learning data unit 130 may be used by the controller 180 using at least one of different types of data analysis, machine learning algorithm, and machine learning technology or a plurality of controllers included in a mobile terminal. Examples of the algorithm and technique include a k-nearest neighbor system, fuzzy logic (e.g., possibility theory), neural networks, Boltzmann machines, vector quantization, pulsed neural nets, support vector machines, maximum margin classifiers, hill-climbing, inductive logic systems, bayesian networks, petri nets (e.g., finite state machines, mealy machines, moore finite state machines), classifier trees (e.g., perceptron trees, support vector trees, markov trees, decision tree forests, random forests), pandemonium models and systems, clustering, artificially intelligent planning, artificially intelligent forecasting, data fusion, sensor fusion, image fusion, reinforcement learning, augmented reality, pattern recognition, automated planning, and the like.

The controller 180 may determine or predict at least one executable operation of the mobile terminal on the basis of information determined or generated using data analysis, a machine learning algorithm, and a machine learning technology. To this end, the controller 180 may request, search, receive, or utilize data of the learning data unit 130. The controller 180 may perform various functions implementing a knowledge-based system, an inference system, a knowledge obtaining system, and the like, and may perform various functions including a system for uncertain inference (e.g., a fuzzy logic system), an adaptation system, a machine learning system, an artificial neural network, and the like.

The controller 180 may include sub-modules allowing for processing a voice and natural language such as an I/O processing module, an environment condition module, a speech-to-text (STT) processing module, a natural language processing module, a work flow processing module, a service processing module. Each of the sub-modules may have authority to access one or more systems, data and model, or a sub-set or super-set thereof in a mobile terminal. Here, targets, for which each of the sub-modules have authority to access, may include scheduling, a vocabulary index, user data, a task flow model, a service model, and an automatic speech translation (ASR) system. In another embodiment, the controller 180 or the mobile terminal may be implemented as the sub-module, system, or data and model.

In some embodiments, on the basis of data from the learning data unit 130, the controller 180 may be configured to detect and sense a user request on the basis of a user input, a context condition expressed by an input of a natural language, or a user intention. Also, the controller 180 may positively derive or obtain information required for completely determining a user request according to a context condition or a user intention. For example, the controller 180 may detect and sense a user request by analyzing past data including past input and output, patterning matching, an unambiguous word, an input intention, and the like. Also, the controller 180 may determine a work flow for executing a function requested by a user according to a context condition or a user intention. Also, the controller 180 may execute a work flow for satisfying user demand on the basis of a context condition or user intention.

In some embodiments, the controller 180 may implement a dedicated hardware element for a learning data process including memistor, memristors, a mutual conductance amplifier, a pulse type neural circuit, an artificial intelligent nano-technology system (e.g., an autonomous nano-machine), or an artificial intelligent quantum machine system (e.g., a quantum neural network), and the like. In some embodiments, the controller 180 may include a pattern recognition system such as a machine vision system, an audio recognition system, a handwriting recognition system, a data fusion system, a sensor fusion system, and a soft sensor. The machine vision system may include content-based image search, optical character recognition, augmented reality, egomotion, tracking, an optical flow, and the like. The controller 180 may sense or receive information within a mobile terminal, surrounding environment information of the mobile terminal, or any other information through the sensing unit 140. Also, the controller 180 may receive a broadcast signal and/or broadcast-related information, a radio signal, wireless data, and the like, through the wireless communication unit 110. Also, the controller 180 may receive image information (or corresponding signal), audio information (or corresponding signal), data, or information input from a user, through an input unit.

The controller 180 may collect information, process and classify the collected information (e.g., a knowledge graph, a command policy, a personalized database, a conversation engine, etc.), and store the processed or classified information in the memory 170 or the learning data unit 130.

Also, regarding the learning data unit 130, when an operation of the mobile terminal is determined on the basis of data analysis, a machine learning algorithm, and a machine learning technology, the controller 180 may control the components of the mobile terminal to execute the determined operation. The controller 180 may execute the determined operation by controlling the mobile terminal on the basis of a control command.

In an embodiment, when a specific operation is performed, the controller 180 may analyze history information indicating performing of a specific operation through data analysis, the machine learning algorithm, and the machine learning technology, and update existing learned information on the basis of the analysis information. Thus, the controller 180 may enhance accuracy of future performance of the data analysis, the machine learning algorithm, and the machine learning technology based on updated information, together with the learning data unit 130.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact.

The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

An electronic device according to the present disclosure may execute a voice recognition function to recognize a voice and control an operation of an electronic device on the basis of the recognized voice. The voice recognition function, which refers to a function to control an electronic device through a voice, may include a natural language processing function to analyze a natural language, a question and answer function to propose an answer to a question, a voice processing function to convert a digital voice signal into a language which can be processed in a computer, and an automatic interpreting and translation function to convert a voice into a many languages.

Hereinafter, in the drawing, a state in which an electronic device is implemented in the form of a speaker outputting a voice will be described but the present disclosure is not limited thereto and it will be obvious to a person skilled in the art that the electronic device may also be implemented in various other forms such as a smartphone, or the like.

Figure 2:
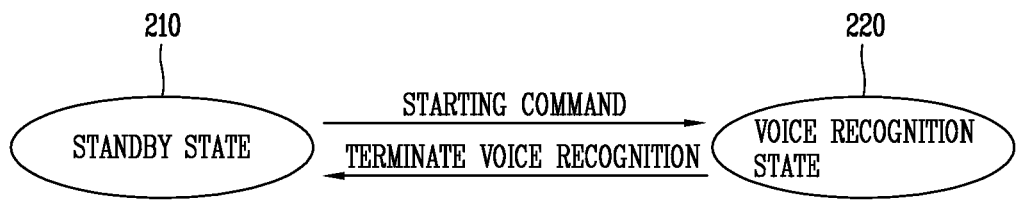
FIG. 2 is a conceptual view illustrating an operational state of an electronic device which executes a voice recognition function.

First, as for the electronic device according to the present disclosure, an operational state of the electronic device related to execution of a voice recognition function will be described. FIG. 2 is a conceptual view illustrating an operational state of the electronic device which executes a voice recognition function.

Referring to FIG. 2, the electronic device according to the present disclosure may be set to a standby state 210 or a voice recognition state 220.

The standby state 210 is a state in which whether there is a voice related to execution of the voice recognition function around the electronic device before the voice recognition function is executed. To this end, the controller 180 may monitor whether a sound with specific loudness or greater is continuously sensed through the microphone in the standby state 210.

Since voice analysis is not performed in the standby state 210, only a current of low power, e.g., about 4.4 mA, may be consumed. The standby state 210 may also be termed a 'listening phase'.

When a sound of a specific volume or greater is sensed in the standby state 210, the controller 180 may switch the standby state 210 to the voice recognition state 220.

The voice recognition state 220 is a state in which the controller 180 analyzes a voice input through the microphone. Since voice recognition is performed in the voice recognition state 220, more current is consumed in the voice recognition state 220, compared with the standby state 210. That is, before a starting word is received, the electronic device according to the present disclosure is in the standby state 210 in which voice analysis is not performed, reducing power consumption.

A voice analysis method will be described in detail. The controller 180 may determine whether a starting word for starting voice recognition is received in the voice recognition state 220 before voice analysis.

The starting word is a control command for starting voice analysis and may be set to various words in each device. For example, the starting word may be set to "Hello, my phone", "Alexa", "OK, google", and the like. The controller 180 may start voice analysis on a voice pronounced after the starting word.

In the voice recognition state 220, the controller 180 may analyze voice information received after the starting word using a voice recognition algorithm. Also, the controller 180 may control the electronic device according to a voice command corresponding to the voice information on the basis of an analysis result. Also, such voice analysis may be performed using a separate third party application installed in the electronic device.

In order to process analysis information obtained by analyzing the voice through an artificial intelligence algorithm, the controller 180 may transmit it to a preset artificial intelligence server. The preset artificial intelligence server is a server providing a function of learning a huge amount of information using an artificial intelligence algorithm and deriving optimal result information on the basis of the learned information. The preset artificial intelligence server may communicate with the electronic device and include a learning data unit 130 storing learned data.

Or, the controller 180 may have the learning data unit 130 by itself and generate result information in response to input voice information on the basis of data stored in the learning data unit 130. Hereinafter, it is assumed that the electronic device is set to receive result information through communication with the artificial intelligence server.

Meanwhile, in case where a preset starting word is not received or a voice is not received for a preset period of time in the voice recognition state 220, the controller 180 may switch the voice recognition state 220 back to the standby state 210. So far, an operation state of the electronic device related to the voice recognition function has been described.

Hereinafter, a method by which the electronic device performs communication with a plurality of artificial intelligence servers will be described.

Figure 3:
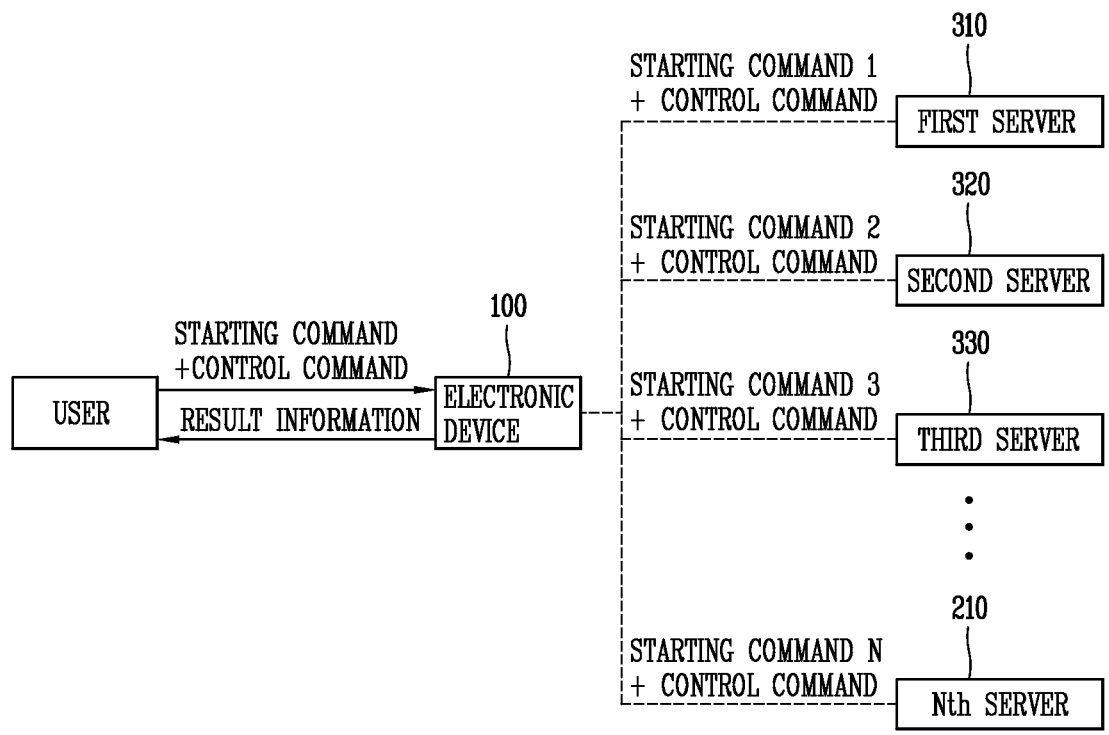
FIG. 3 is a conceptual view illustrating a method by which an electronic device related to the present disclosure communicates with a plurality of artificial intelligence servers.
Figure 4:
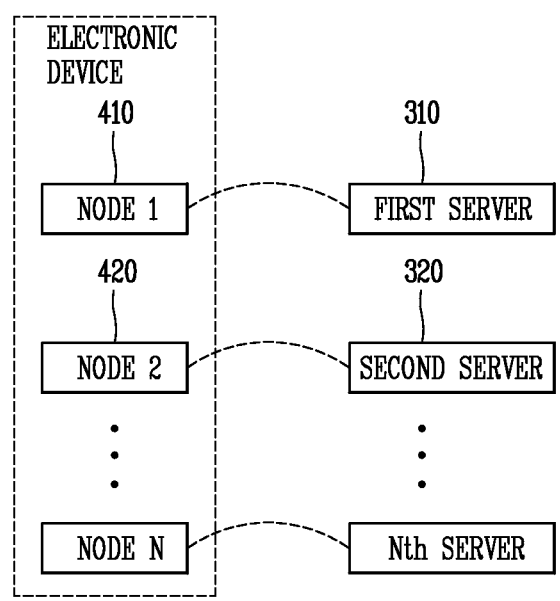
FIG. 4 is a conceptual view illustrating a configuration in which an electronic device related to the present disclosure sets a network node to perform communication with a plurality of artificial intelligence servers.
Figure 5:
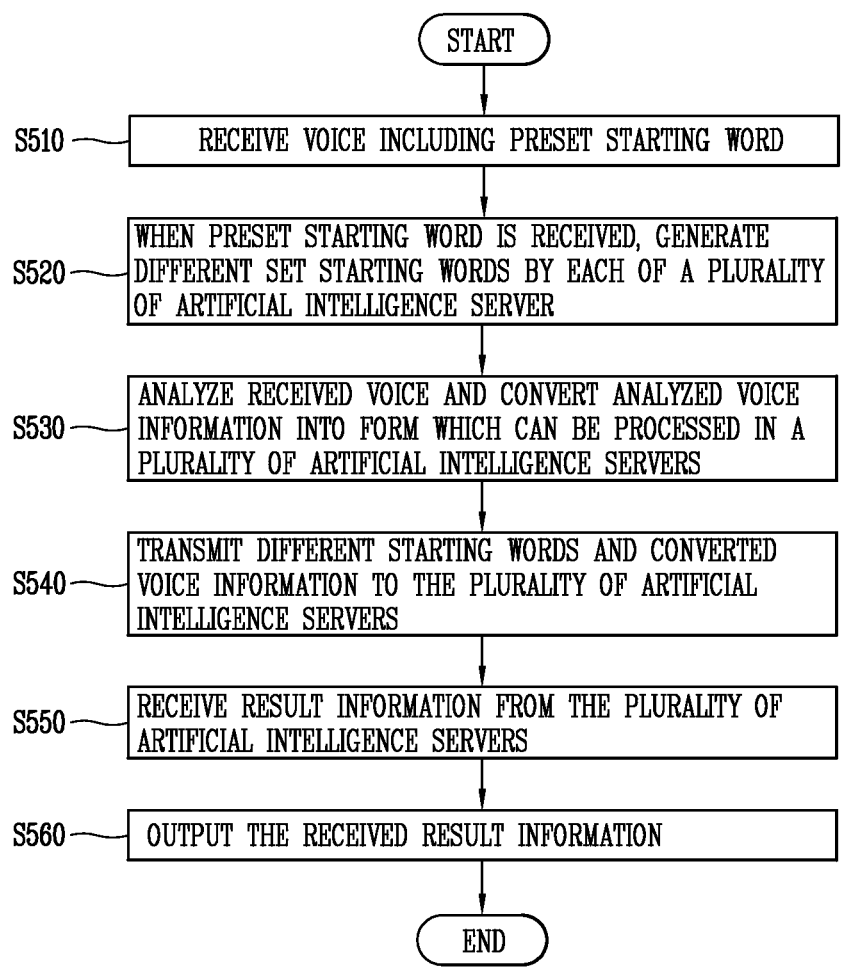
FIG. 5 is a flow chart illustrating a method for providing result information by an electronic device related to the present disclosure through communication with a plurality of artificial intelligence servers.
Figure 6:
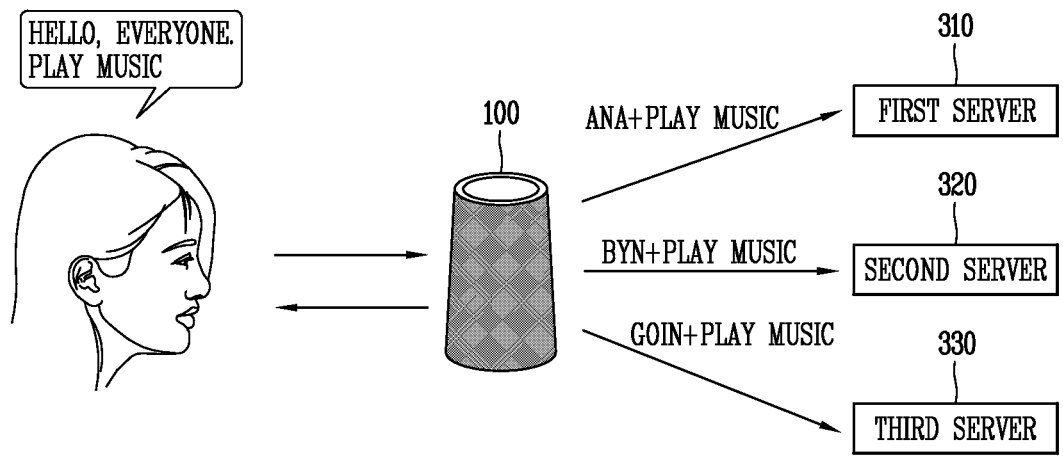
FIG. 6 is a conceptual view illustrating an embodiment implemented by a control method of FIG. 5.

FIG. 3 is a conceptual view illustrating a method by which an electronic device related to the present disclosure communicates with a plurality of artificial intelligence servers, FIG. 4 is a conceptual view illustrating a configuration in which an electronic device related to the present disclosure sets a network node to perform communication with a plurality of artificial intelligence servers, FIG. 5 is a flow chart illustrating a method for providing result information by an electronic device related to the present disclosure through communication with a plurality of artificial intelligence servers, and FIG. 6 is a conceptual view illustrating an embodiment implemented by a control method of FIG. 5.

Referring to FIG. 3, the electronic device 100 may be formed to perform communication with a plurality of artificial intelligence servers. Thus, when the user inputs a control command to the electronic device 100 once, the user may be provided with result information generated by the plurality of artificial intelligence servers through the electronic device 100.

To this end, as illustrated in FIG. 4, the electronic device 100 may generate a network node for each of the plurality of artificial intelligence servers. The generate network node is virtual node for communication with each of the plurality of artificial intelligence servers. The network nodes 410, 420, . . . may store registration information of the artificial intelligence servers associated therewith, respectively. The controller 180 may perform communication with each of the artificial intelligence servers using the registration information of the artificial intelligence servers stored in the network nodes. The registration information may include unique information related to the artificial intelligence server such as starting word information for activating the artificial intelligence server, type information of data which can be processed in the artificial intelligence server, a network address of the artificial intelligence server, and the like. The process may be termed a registration procedure for registering an artificial intelligence server to the electronic device.

In detail, the electronic device 100 may perform the registration procedure for registering the plurality of artificial intelligence servers on the basis of a user's control command.

First, the electronic device may be set to be able to communicate with a specific artificial intelligence server at the time of manufacturing the electronic device, so as to be released. The specific artificial intelligence server may be set as a default so that it can communicate with the electronic device although the user does not perform any other registration process.

Using the artificial intelligence server set as a default, the controller 180 may search for a plurality of artificial intelligence servers which can be registered with the electronic device. Also, when communication connection with the searched artificial intelligence server is required, the controller 180 may check a state of the wireless communication unit 110. When the wireless communication unit 110 is not activated according to a check result, the controller 180 may activate the wireless communication unit.

When the wireless communication unit 110 is activated according to the check result, the controller 180 may perform a registration procedure for registering the searched artificial intelligence server. For example, the controller 180 may output a user interface for receiving user information (log-in information) required for the artificial intelligence server. When a plurality of artificial intelligence servers are registered, the controller 180 may generate a network node for each server and communicate with the plurality of artificial intelligence servers. In the above, the method for registering a plurality of artificial intelligence servers in the electronic device has been described.

Hereinafter, a method for providing result information by utilizing the plurality of artificial intelligence servers registered in this manner will be described.

Referring to FIG. 5, first, the controller 180 of the electronic device 100 according to the present disclosure may receive a voice including s preset starting word (S510)>

The controller 180 may sense that a voice of a specific volume or greater occurs near the electronic device 100 in the standby state 210. Here, the controller 180 may switch the standby state to the voice recognition state 220 and determine whether the voice of the specific volume or greater includes the preset starting word.

The preset starting word is a control command set for activating all of the plurality of artificial intelligence servers. For example, the preset starting word may be set to "Hello, everyone", "Hi, everybody", Hey everyone", and the like. The preset starting word may be changed by the user.

The preset starting word may be set to be different from a starting word set in each of the plurality of artificial intelligence servers. For example, the plurality of artificial intelligence servers may have a preset starting word such as "Alexa", "OK, google", "Hey, siri", or "aria". Thus, in order to avoid confusion with a starting word of a specific artificial intelligence server, the preset starting word may be set as a general term designating all of the plurality of artificial intelligence servers.

When the voice of the specific volume or greater includes a preset starting word, the controller 180 may analyze a voice received after the preset starting word is received. Also, the controller 180 may transmit the analyzed voice information to the plurality of artificial intelligence servers.

In contrast, when a starting word set in a specific artificial intelligence server is included in the voice of the specific volume or greater, the controller 180 may selectively transmit a voice received after the preset starting word is received, only to the specific artificial intelligence server. In the other remaining artificial intelligence servers, the analyzed voice information is not received.

Or, when both the preset starting word or the starting word set in the specific artificial intelligence server are not included in the voice of the specific volume or greater, the controller 180 may switch the voice recognition state 210 to the standby state 220. Thus, the controller 180 does not analyze a voice received after the preset starting word.

Hereinafter, an operation of the mobile terminal in case where a preset starting word is not included in a voice of a specific volume or greater will be described in detail.

Referring back to FIG. 5, when a preset starting word is received, the controller 180 may generate mutually different starting words respectively set for the plurality of artificial intelligence servers (S520). Also, the controller 180 may analyze the received voice and convert the analyzed voice information into a form which can be processed by the plurality of artificial intelligence servers (S530).

When the preset starting word is received, the controller 180 may search for registration information of the plurality of artificial intelligence servers. Also, the controller 180 may generate mutually different starting words respectively set for the plurality of artificial intelligence servers. The mutually different starting words may be commands set for activating the plurality of artificial intelligence servers.

Here, activation of the artificial intelligence server is a state in which the artificial intelligence server is set to receive information from the electronic device and transmit result information to the electronic device in response to the received information. Conversely, deactivation of the artificial intelligence server is a state in which the artificial intelligence server does not receive information from the electronic device.

Also, when the preset starting word is received, the controller 180 may analyze voice information corresponding to the received voice. In detail, the controller 180 may analyze the voice received through a voice reception unit, through a natural language processing algorithm. Also, the controller 180 may convert the analyzed voice information into a language which can be processed in a computer.

In more detail, the controller 180 may convert the voice such that the generated mutually different starting words are included in the voice.

Meanwhile, the plurality of artificial intelligence servers may be set to process different formats of data. Here, the controller 180 may convert the analyzed voice information into a data format required for each of the artificial intelligence servers. For example, when the first artificial intelligence server is able to process voice data, the controller 180 may convert the received voice into a form of voice data, and when the second artificial intelligence server is able to process text data, the controller 180 may convert the received voice into a form of text data.

Thereafter, the controller 180 may transmit the converted voice information including the generated different starting words into each of the plurality of artificial intelligence servers (S540).

The controller 180 may transmit voice information including mutually different starting words for each of the plurality of artificial intelligence servers. For example, referring to FIG. 6, the controller 180 may receive a voice "Hello, everyone, please turn on music" from the user.

In case where "Hello, every" corresponds to a preset starting word, the controller 180 may generate mutually different starting words set in the plurality of artificial intelligence servers. For example, the controller 180 may generate "ANA", a starting word set in a first server 310 (or server 1), "BYN", a starting word set in a second server 320 (or server 2), and "GOIN", a starting word set in a third server 330 (or server 3).

Also, the controller 180 may analyze a voice "please turn on music" received after the preset starting word. Also, the controller 180 may convert the analyzed voice information into a data format required for the first, second, and third servers 310, 320, and 330.

The controller 180 may transmit the voice information converted to include the generated different starting words into the first, second, third servers 310, 320, and 330. In this manner, in the present disclosure, the user's voice may be transmitted such that different artificial intelligence servers may be able to recognize the voice.

When the starting words and voice information set for each server are received, the plurality of artificial intelligence servers may generate result information corresponding to the voice information using a machine learning algorithm. Also, the artificial intelligence servers may transmit the result information to the electronic device 100.

After the mutually different starting words and the converted voice information, the controller 180 of the electronic device 100 may receive a plurality of pieces of result information from the plurality of artificial intelligence servers (S550). Also, the controller 180 may output the received result information (S560).

When the plurality of pieces of result information are received, the controller 180 may sequentially output the plurality of pieces of result information through an output unit. The output unit may include a display unit and a voice output unit (i.e., speaker).

In detail, the controller 180 may sequentially output the plurality of pieces of result information on the basis of priority levels of the plurality of artificial intelligence servers. That is, the controller 180 may sequentially output result information, starting from result information transmitted from a server with highest priority.

Or, the controller 180 may selectively output only some of the pieces of result information with high priority among the plurality of pieces of result information. Here, the controller 180 may output the other remaining pieces of result information with low priority in response to a request received from the user.

The priority may be determined based on various evaluation factors. to this end, the controller 180 may further perform an evaluation step of evaluating each of the artificial intelligence servers in the step of registering the plurality of artificial intelligence servers.

In the step of evaluating a specific artificial intelligence server, the controller 180 may transmit a question list including a plurality of pieces of question information previously set for the server to the specific artificial intelligence server. Answer information regarding the question information included in the question list may be previously stored in the memory of the electronic device 100.

Also, the controller 180 may receive answer information from the specific artificial intelligence server in response to the question list, and calculate an evaluation score regarding the specific artificial intelligence server on the basis of the received answer information. For example, the controller 180 may calculate an evaluation score by comparing the previously stored answer information and the answer information received from the artificial intelligence server.

The controller 180 may perform the evaluation step on the plurality of artificial intelligence servers and set priority levels of the plurality of artificial intelligence server on the basis of an evaluation score of each of the artificial intelligence servers.

Also, after the registration step is completed, the controller 180 may update priority using user's answer information. In detail, the controller 180 may sense user's answer information regarding the result information transmitted from the artificial intelligence server, and re-calculate an evaluation score of the artificial intelligence server according to the sensed answer information. For example, when a positive answer with respect to the result information transmitted from the first artificial intelligence server is sensed, the controller 180 may raise the evaluation score of the first artificial intelligence server. Here, as the evaluation score is raised, the controller 180 may also increase a priority level of the first artificial intelligence server.

In the above, the method for operating a plurality of artificial intelligence servers set to operate on the basis of mutually different starting words, by one starting word has been described. In this manner, search accuracy in searching for result information desired by the user may be enhanced. Also, since several servers may be simultaneously operated through a simple command, user convenience may be enhanced.

Figure 7:
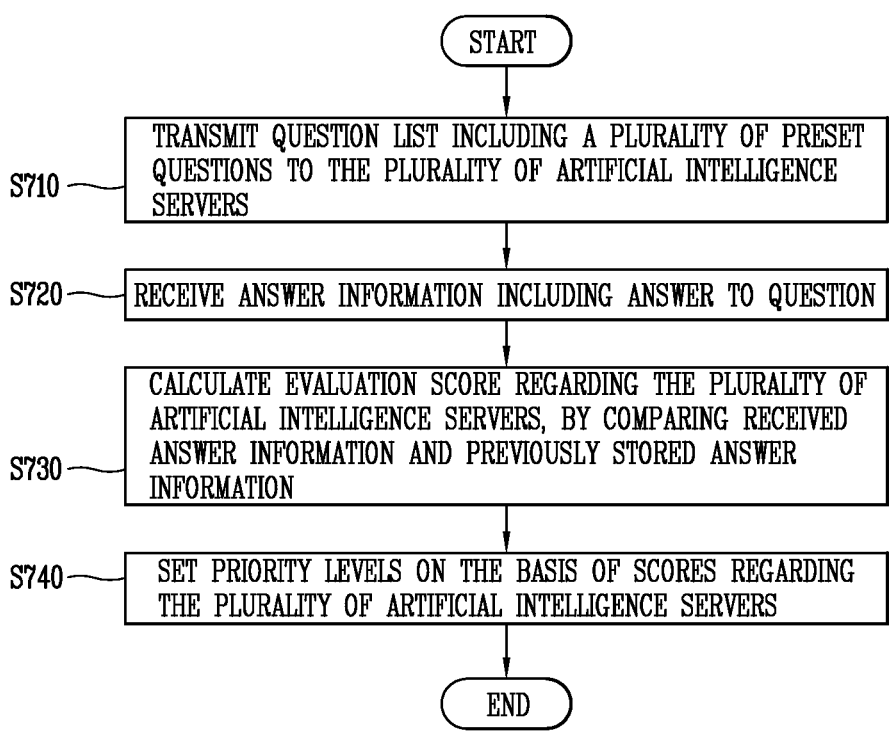
FIG. 7 is a flow chart illustrating a method for registering an artificial intelligence server in an electronic device related to the present disclosure.

Hereinafter, a method for registering a plurality of artificial intelligence servers in the electronic device 100 will be described in detail. FIG. 7 is a flow chart illustrating a method for registering an artificial intelligence server in an electronic device related to the present disclosure. FIGS. 8A to 9B are conceptual views illustrating the registering method of FIG. 7.

The electronic device 100 according to the present disclosure may search for a plurality of artificial intelligence servers which can be registered, through an artificial intelligence server set as a default. Also, the controller 180 may perform a procedure for registering the plurality of artificial intelligence servers on the basis of a user request.

When the registration procedure regarding the plurality of artificial intelligence servers is performed, the controller 180 may evaluate inquiry capabilities of each artificial intelligence server.

In detail, referring to FIG. 7, the controller 180 may transmit a question list including a plurality of preset questions to the plurality of artificial intelligence servers (S710).

In case where an artificial intelligence server is registered in the electronic device 100, a question list for performing previously evaluation on answer capabilities of the artificial intelligence server may be stored in the memory 170 of the electronic device 100 according to the present disclosure.

The question list may be a list including a plurality of questions as items. Questions included in the question list may include a question regarding a universal fact of humankind. For example, the question included in the question list may be a question about what's the name of the capital of the Republic of Korea or a question of about the name of the present president of the Republic of Korea.

Also, the question list may include an accidental question. The accidental question may include a question in a language rather than a language which can be provided in the electronic device, a question related to information included in a user database, and the like. In the present disclosure, through such an accidental question, answer capabilities of the artificial intelligence server may be evaluated from various angles.

Figure 8A:
FIGS. 8A to 9B are conceptual views illustrating the registering method of FIG. 7.
Figure 8B:
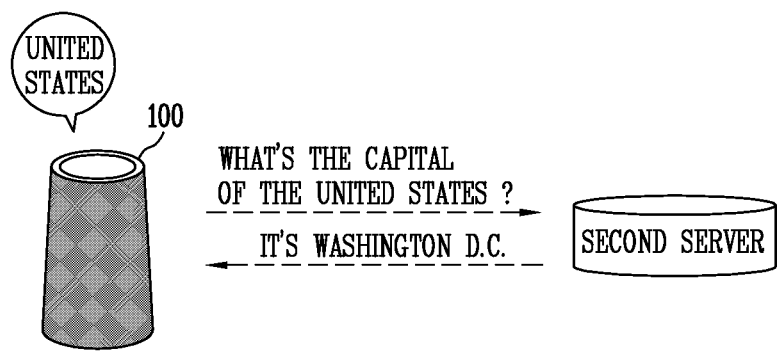

Meanwhile, the controller 180 may change a question included in the question list according to a country in which the electronic device 100 is positioned. A position of the electronic device may be set by the user or may be determined according to position information received from a position receiving unit provided in the electronic device 100. For example, as illustrated in FIG. 8B, when the electronic device 100 is positioned in the United States, the controller 180 may include a question asking about the capital of the United States in the question list, and as illustrated in FIG. 8A, when the electronic device 100 is positioned in Korea, the controller 180 may include a question asking about the capital of Korea in the question list.

In this manner, in the present disclosure, the electronic device may be evaluated through a question which is universally common to a country in which the electronic device is in use. Through this, in the present disclosure, when the electronic device is evaluated, a more user-specified evaluation score may be calculated by reflecting country information of the user of the electronic device.

In addition, the controller 180 may change a question included in the question list according to a kind of a language spoken by the user or a kind of a language provided in the electronic device, in addition to the country in which the electronic device is positioned.

When a plurality of artificial intelligence servers are searched from the artificial intelligence server set as a default and a registration procedure regarding the plurality of artificial intelligence servers is performed, the controller 180 may transmit the question list to each artificial intelligence server.

The controller 180 may receive answer information including an answer to the question from the plurality of artificial intelligence servers (S720). Also, the controller 180 may calculate an evaluation score regarding a plurality of artificial intelligence servers, by comparing the received answer information and the previously stored answer information (S730).

The controller 180 may receive answer information including an answer generated in response to the question list from the plurality of artificial intelligence servers. The answer information may be an answer regarding a question generated using a database provided in each artificial intelligence server. Thus, since answer information is determined by the information stored in the database provided in each artificial intelligence server or by an algorithm based on which the artificial intelligence server generates answer information, the answer information may be generated to be different in each artificial intelligence server.

The controller 180 may calculate an evaluation score evaluating answer capabilities of each artificial intelligence server on the basis of answer information received from each of the plurality of artificial intelligence servers.

First, answer information regarding a question included in the question list may be stored together with question information in the memory 10 of the electronic device 100. For example, over a question asking about the name of the capital of the Republic of Korea, answer information of "Seoul" may be stored, and over a question asking about the name of the present president of the Republic of Korea, answer information such as "Moon Jae-in, 19$^{th}$ president of the Republic of Korea" may be stored.

Also, in the memory 170, an evaluation score for each answer may be previously set. The information set as a correct answer may be set to 10, information similar to the correct answer may be set to 5 scores, non-answer information may be set to score 0, and −1 may be set for any other information. The any other information may be a wrong answer, which is not stored in the memory 170. For example, regarding a question about the capital of the Republic of Korea, an answer of "Seoul" may be set to 10 scores, an answer of "Pusan" or SaeJong may be set to 5 scores, an answer of "I don't know" may be set to 0 score, and an answer of "New York" may be set to −1 score.

The controller 180 may compare the answer information received from the artificial intelligence server with answer information stored in the memory 170, and calculate an evaluation score according to a comparison result. In detail, the controller 180 may determine to which answer of the answer information stored in the memory 170 the answer information received from the artificial intelligence server corresponds, and give an evaluation score of the artificial intelligence server on the basis of a determination result. Or, the controller 180 may determine similarity between the answer information stored in the memory 170 and the answer information received from the artificial intelligence server, and give an evaluation score according to the similarity. Here, the evaluation score may be set in the memory 170 according to the similarity to a correct answer.

For example, when answer information such as "city of seoul", "Seoul Special City", "Kangnam", "Jongno", and the like, similar to "Seoul", are received, the memory 170 may determine their similarity to "Seoul", correct answer information stored in the memory 170, and give evaluation scores, starting from highest similarity. For example, "city of seoul" and "Seoul Special City" which are matched by 100% may be given 10 scores, and "Kangnam" and "Jongno" which are matched by 60% may be given 6 scores. Meanwhile, in the case of answer information regarding an accidental question, the controller 180 may calculate an evaluation score on the basis of a type of a question language. For example, when an answer "seoul" in English is received as an answer to a question "what's a capital of korea?", the controller 180 may give 10 scores, and when an answer "서 울" in Korean is received, the controller 180 may give 9 scores.

The controller 180 may set priority levels of a plurality of artificial intelligence servers on the basis of evaluation scores regarding the plurality of artificial intelligence servers (S740).

The controller 180 may set priority levels of the plurality of artificial intelligence servers on the basis of the calculated evaluation scores of the plurality of artificial intelligence servers. In detail, the controller 180 may set higher priority as an evaluation score is higher. Here, priority is order in which pieces of result information received from the plurality of artificial intelligence servers are output. That is, the controller 180 may sequentially output the pieces of result information according to priority.

Figure 9A:
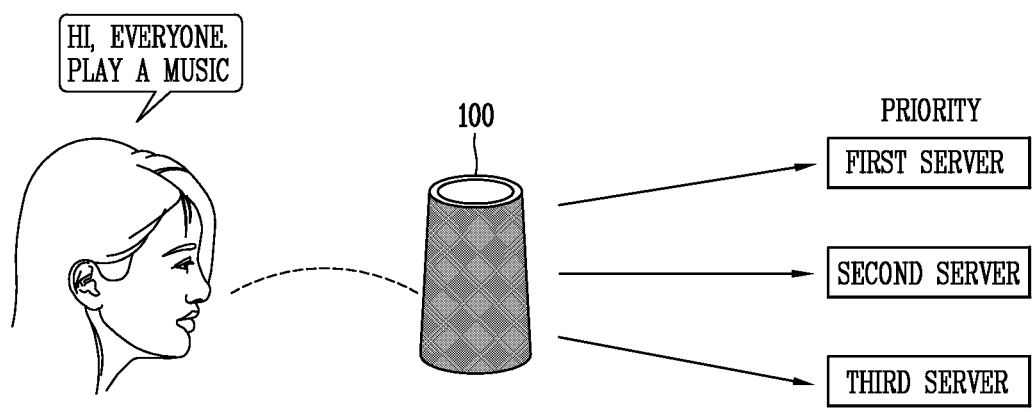
Figure 9B:
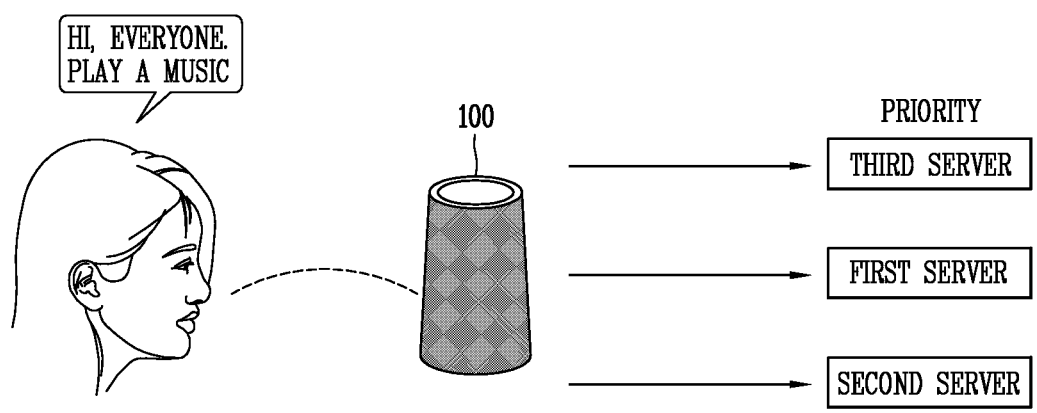

Meanwhile, when evaluation scores are the same, the controller 180 may determine priority on the basis of at least one of a position in which the electronic device 100 is in use and a language of the user of the electronic device 100. For example, in case where a position in which the electronic device 100 is in use is Korea and a first artificial intelligence server and a second artificial intelligence server have the same evaluation score, the controller 180 may set the first artificial intelligence server to have higher priority. In another example, as illustrated in FIG. 9A, in case where the user of the electronic device 100 uses English and first, second and third artificial intelligence servers have the same evaluation score, the controller 180 may set the first, second, and third artificial intelligence servers to have priority in the order of the first, second, and third artificial intelligence servers. Also, as illustrated in FIG. 9B, in case where the user of the electronic device 100 uses Korean and the first, second, and third artificial intelligence servers have the same evaluation score, the controller 180 may set the first, second, and third artificial intelligence servers to have priority in the order of the third, first, and second artificial intelligence servers.

A higher priority may be set. That is, the controller 180 may provide higher priority to an artificial intelligence server provided in a corresponding country according to a position in which the electronic device is used or a language of the user.

In the above, the method for setting priority levels of a plurality of artificial intelligence servers when the artificial intelligence servers are registered in the electronic device has been described. In this manner, in the present disclosure, pieces of result information received from the plurality of artificial intelligence servers may be sequentially output according to the priority levels of the servers.

Figure 10:
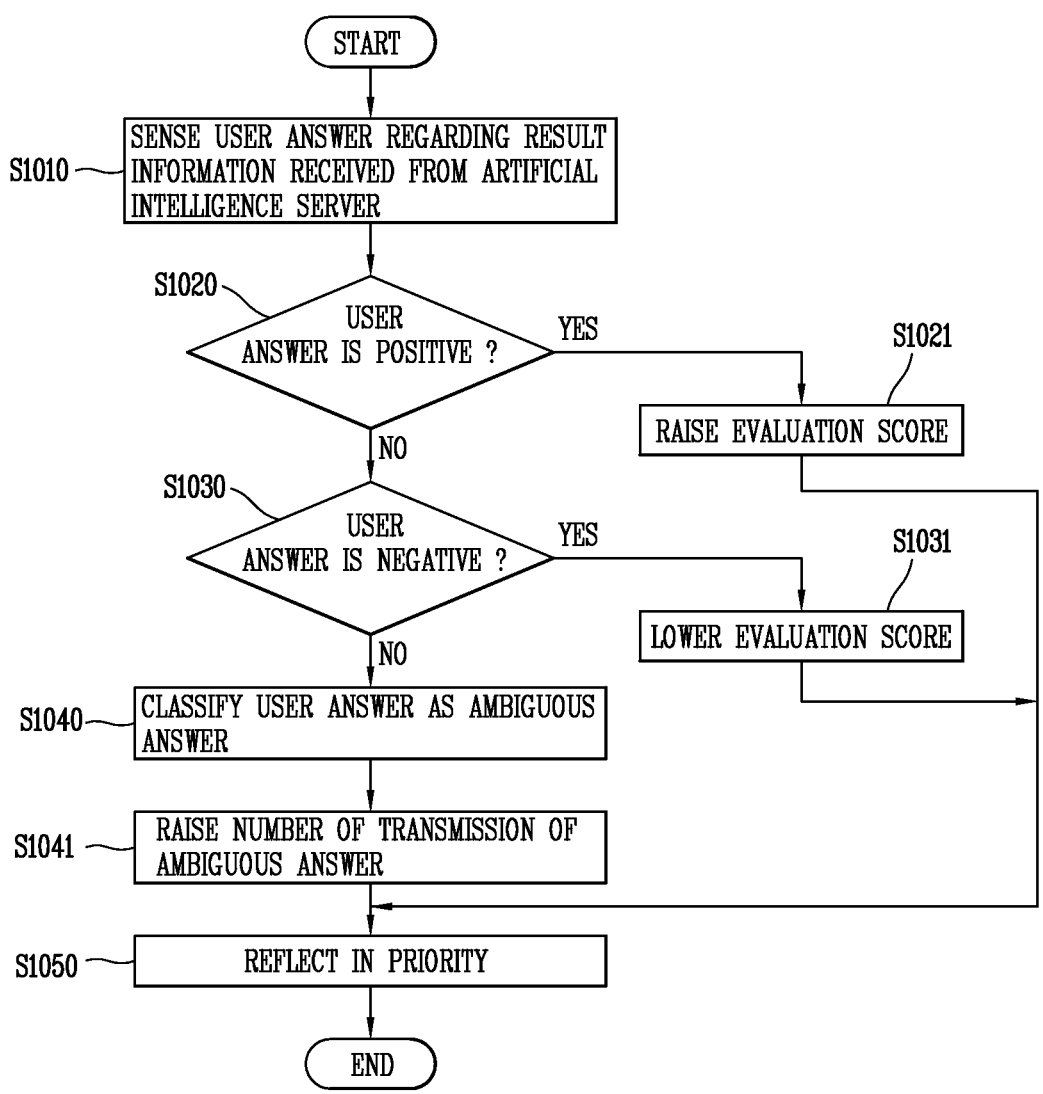
FIG. 10 is a flow chart illustrating a method for updating priority of a plurality of artificial intelligence servers after the plurality of artificial intelligence servers are registered.
Figure 11:
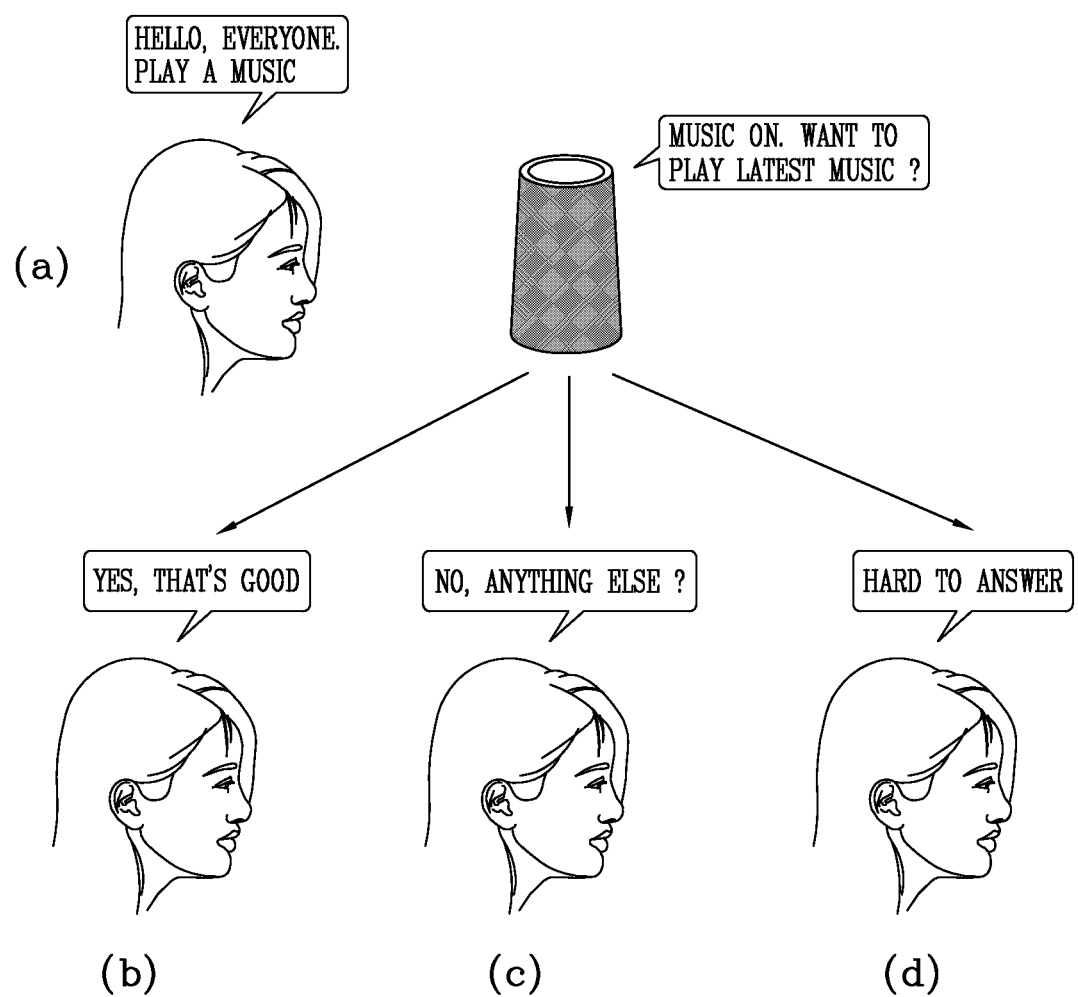
FIG. 11 is a conceptual view illustrating types of user response regarding result information.

Hereinafter, a method for updating priority levels of a plurality of artificial intelligence servers after the plurality of artificial intelligence servers are registered will be described. FIG. 10 is a flow chart illustrating a method for updating priority of a plurality of artificial intelligence servers after the plurality of artificial intelligence servers are registered, and FIG. 11 is a conceptual view illustrating types of user answer regarding result information.

In case where a plurality of artificial intelligence servers are registered in the electronic device 100, the controller 180 may obtain result information regarding a user request using the plurality of artificial intelligence servers. Meanwhile, the controller 180 may update the priority levels set at the time of registering the plurality of artificial intelligence servers on the basis of a user answer regarding the obtained result information.

Referring to FIG. 10, first, when the result information is received from the artificial intelligence server, the controller 180 may sense a user answer regarding the received result information (S1010).

The controller 180 may sequentially output a plurality of pieces of result information received from the plurality of artificial intelligence servers. Here, the controller 180 may sense a user's answer with respect to each result information.

In detail, the controller 180 may capture an image of the user at the time of outputting the result information through the camera 121 and analyze the captured image of the user to sense the user's answer. For example, the controller 180 may capture the user's face image, analyze the captured face image, and generate answer information of the user on the basis of an analysis result. For example, when the face image is a positive image, the controller 180 may generate positive answer information, and when the face image is negative image, the controller 180 may generate negative answer information.

Or, the controller 180 may generate answer information of the user on the basis of voice information spoken by the user after the result information is output or at the same time when the result information is output. In detail, as illustrated in FIG. 11, the controller 180 may receive a voice information spoken by the user immediate after the result information is output or at the same time when the result information is output. And, the controller 180 may determine whether the voice information is related to the one or more output responses. Also, the controller 180 may analyze the received voice information and generate positive answer information, negative answer information, and ambiguous answer information using an analysis result. For example, regarding a voice of "Yes, that's good", the controller 180 may classify it as positive answer information. Regarding a voice "No, anything else?", the controller 180 may classify it as negative answer information. Regarding a voice of "hard to answer", the controller 180 may classify it as ambiguous answer information.

The controller 180 determines whether the user's answer is a positive answer (S1020). When the user's answer is a positive answer, the controller 180 may raise an evaluation score of the artificial intelligence server which has transmitted the positive answer (S1021). Thereafter, the controller 180 may reflect the raised evaluation score in priority (S1050).

When an answer regarding result information is positive answer information, the controller 180 may raise the evaluation score and update priority to be increased. In this manner, in the present disclosure, by increasing priority of the artificial intelligence server from which a large amount of positive answers of the user has been received, result information preferred by the user, among the plurality of pieces of result information, may be first provided.

Also, when the user's answer is not a positive answer, the controller 180 may determine whether the user's answer is a negative answer (S1030). When the user's answer is a negative answer, the controller 180 may lower an evaluation score of the artificial intelligence server which has transmitted the negative answer (S1031). Thereafter, the controller 180 may reflect the lowered evaluation score in priority (S1050).

When an answer to the result information is a negative answer, the controller 180 may lower the evaluation score and update priority to be lowered. In this manner, in the present disclosure, by lowering priority of the artificial intelligence server from which a large amount of negative answers of the user has been received, the result information not preferred by the user, among the plurality of pieces of result information, may be provided later.

Also, in case where the user's answer is not a positive or negative answer, the controller 180 may classify the answer as an ambiguous answer (S1040) and raise the number of transmissions of the ambiguous answer in the artificial intelligence server which has transmitted the ambiguous answer (S1041). Thereafter, the controller 180 may reflect the raised number of transmissions of the ambiguous answer in priority (S1050).

In case where the result information is not a positive nor negative answer, the controller 180 may classify it as an ambiguous answer. Also, the controller may determine priority levels of two artificial intelligence servers having the same evaluation score according to the number of times of classifying the answer as an ambiguous answer. In detail, in case where two artificial intelligence servers having the same evaluation score are present, the controller 180 may set a priority level to be lowered as the number of times of classifying an answer as an ambiguous answer.

In the above, the method for updating priority levels of the plurality of artificial intelligence servers according to a user answer regarding the result information transmitted from the plurality of artificial intelligence servers has been described. In this manner, in the present disclosure, result information received from the artificial intelligence server preferred by the user may be preferentially provided.

Figure 12A:
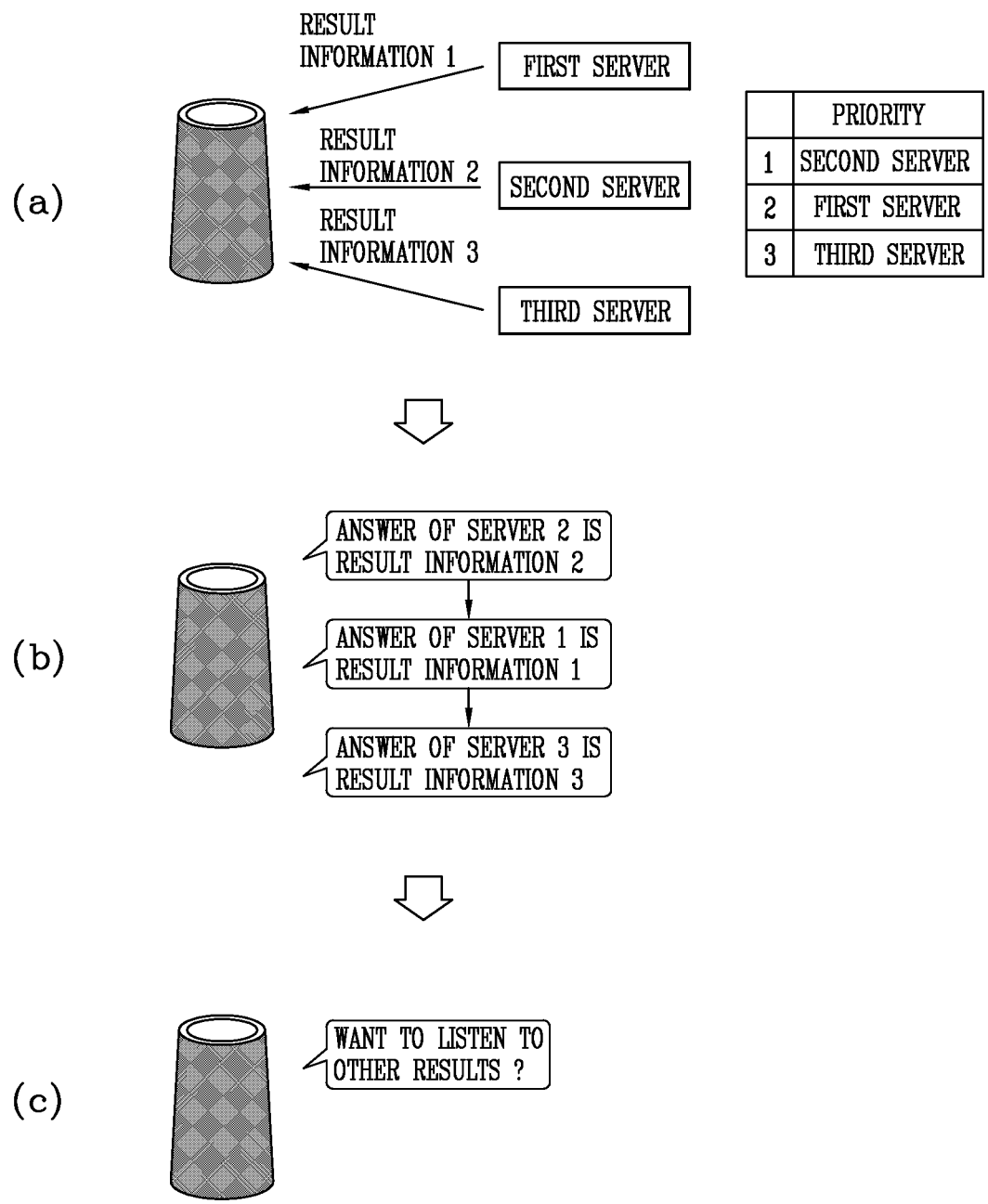
FIGS. 12A to 12C are conceptual views illustrating a method of outputting a plurality of pieces of result information received from a plurality of artificial intelligence servers according to priority.
Figure 12B:
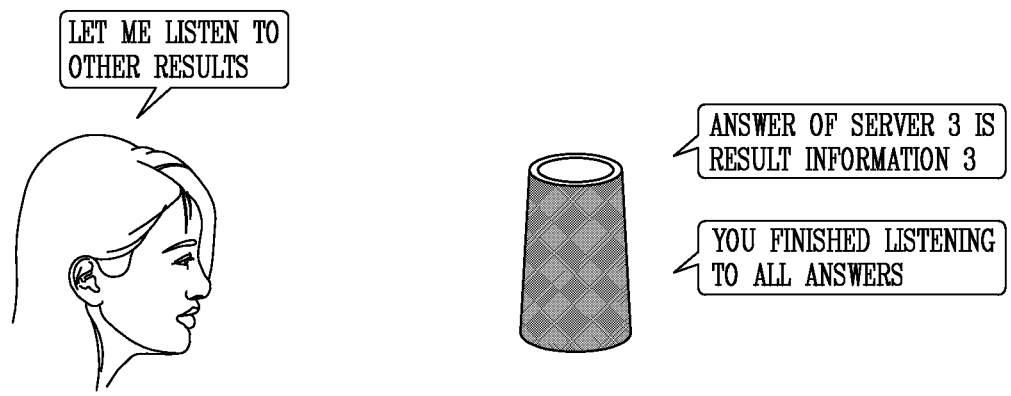
Figure 12C:
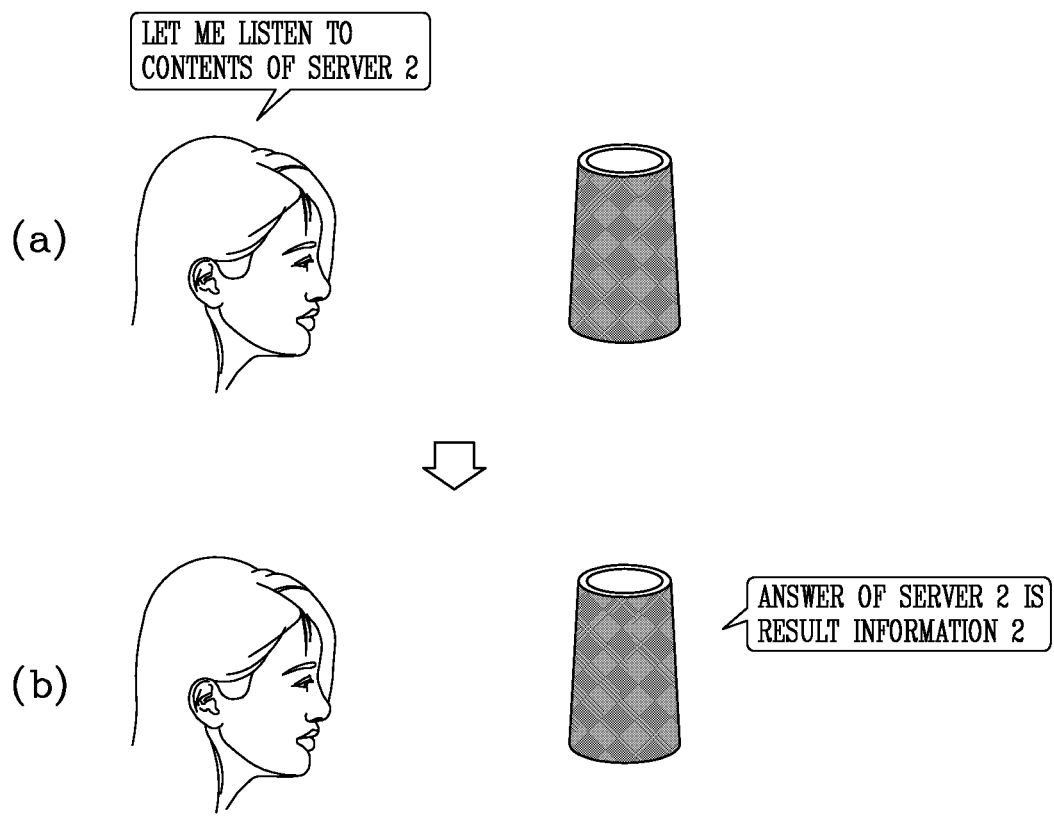

Hereinafter, a method for outputting a plurality of pieces of result information received from a plurality of artificial intelligence servers will be described. FIGS. 12A to 12C are conceptual views illustrating a method of outputting a plurality of pieces of result information received from a plurality of artificial intelligence servers according to priority.

As illustrated in (a) of FIG. 12A, the controller 180 of the electronic device 100 according to the present disclosure may receive a plurality of pieces of result information from a plurality of artificial intelligence servers.

Here, the controller 180 may combine identification information of each artificial intelligence server with result information transmitted from each artificial intelligence server. For example, as illustrated in (b) of FIG. 12A, in the case of result information 2 received from the second artificial intelligence server, the controller 180 may output "server 2", identification information of the second artificial intelligence server, and "result information 2" received from the second artificial intelligence server together. That is, the controller 180 may combine result information as "answer of server 2 is result information 2".

Also, the controller 180 may combine the result information received from each artificial intelligence server with identification information of each artificial intelligence server, and subsequently sequentially output the pieces of result information according to priority levels of the artificial intelligence servers. For example, as illustrated in (b) of FIG. 12A, in case where priority levels of the artificial intelligence servers are in order of server 2 (or second server), server 1 (or first server), and server 3 (or third server), the controller 180 may sequentially output result information received from each of the artificial intelligence servers. That is, the user may preferentially check result information received from an artificial intelligence server with high priority.

Meanwhile, the controller 180 may selectively output only some of pieces of result information with high priority, among the plurality of pieces of result information received from the plurality of artificial intelligence servers. For example, in case where priority levels are set in the order of server 1, server 2, server 3, and server 4, the controller 180 may output only result information of server 1, server 2, and server 3, and may not output result information of server 4.

Here, as illustrated in (c) of FIG. 12A, the controller 180 may output information asking the user about whether to output result information received from the server 4, by voice. Thus, in the present disclosure, it may be set such that result information with low priority is not provided, thus providing a function of interrupting unnecessary information in advance and outputting additional information according to a user request.

After the information asking the user about whether to output the result information received from the server 4 is output, when a request for outputting result information with low priority is received from the user, the controller 180 may output the result information of the server 4.

Or, as illustrated in (a) of FIG. 12C, the controller 180 may receive a user request for outputting specific result information again among the plurality of pieces of result information. The user request may be received by voice. Here, as illustrated in (b) of FIG. 12C, the controller 180 may re-output the specific result information according to the user request, without transmitting the user request to the plurality of artificial intelligence servers again. That is, in the present disclosure, by not performing unnecessary communication with respect to information not required for performing communication with the artificial intelligence servers, the user may be more rapidly responded.

In the above, the method for outputting a plurality of pieces of result information by the electronic device has been described. In this manner, in the present disclosure, a source of a plurality of pieces of result information may be provided and result information with high user preference may be preferentially provided.

Figure 13:
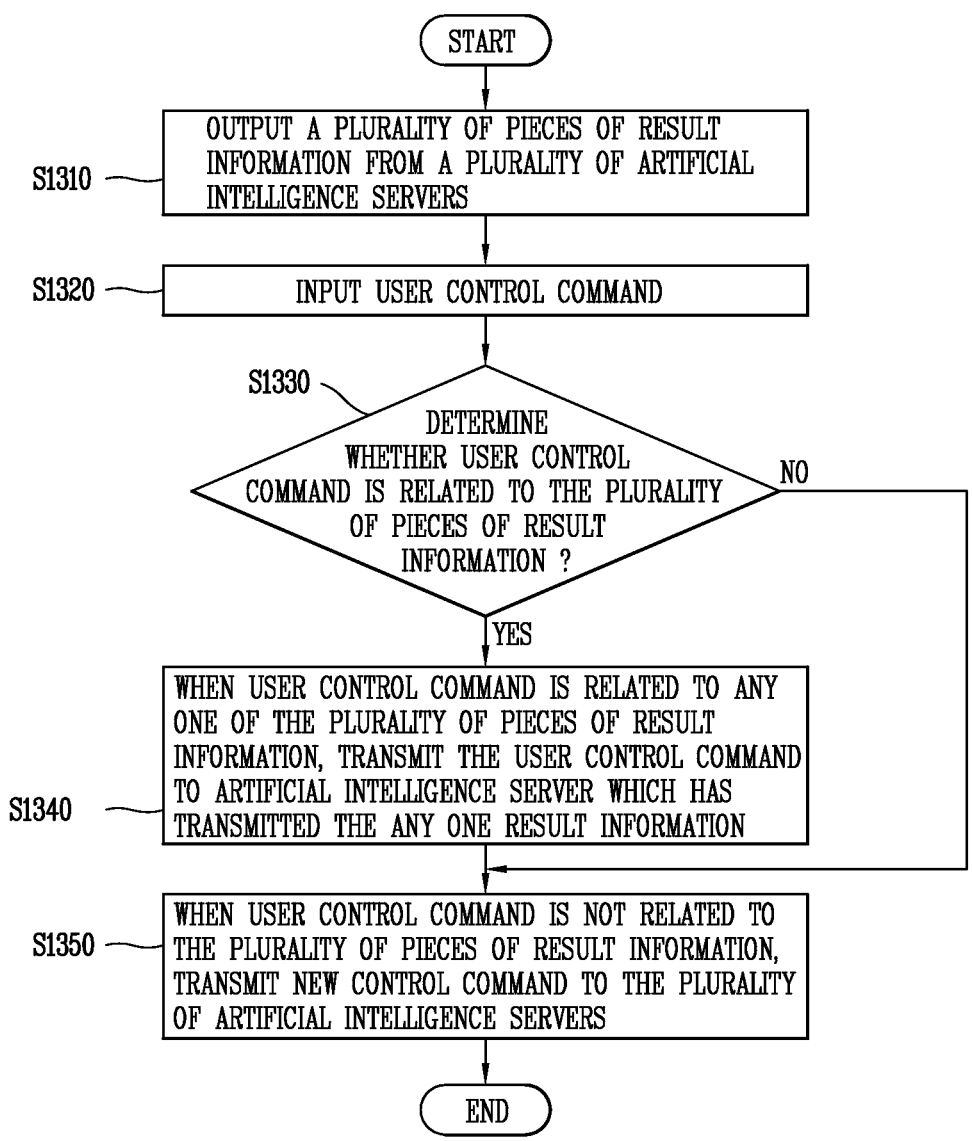
FIG. 13 is a flow chart illustrating an operation of an electronic device when an additional control command is received from a user after a plurality of pieces of result information are output.

Hereinafter, an operational method of the electronic device when an additional control command is received from the user after a plurality of pieces of result information is output will be described. FIG. 13 is a flow chart illustrating an operation of an electronic device when an additional control command is received from a user after a plurality of pieces of result information are output, and FIG. 14 is a conceptual view illustrating an embodiment of the operation of FIG. 13.

Referring to FIG. 13, the controller 180 may sequentially output a plurality of pieces of result information received from the plurality of artificial intelligence servers (S1310).

After the plurality of pieces of result information are output, the controller 180 may receive a new control command from the user (S1320).

Figure 14:
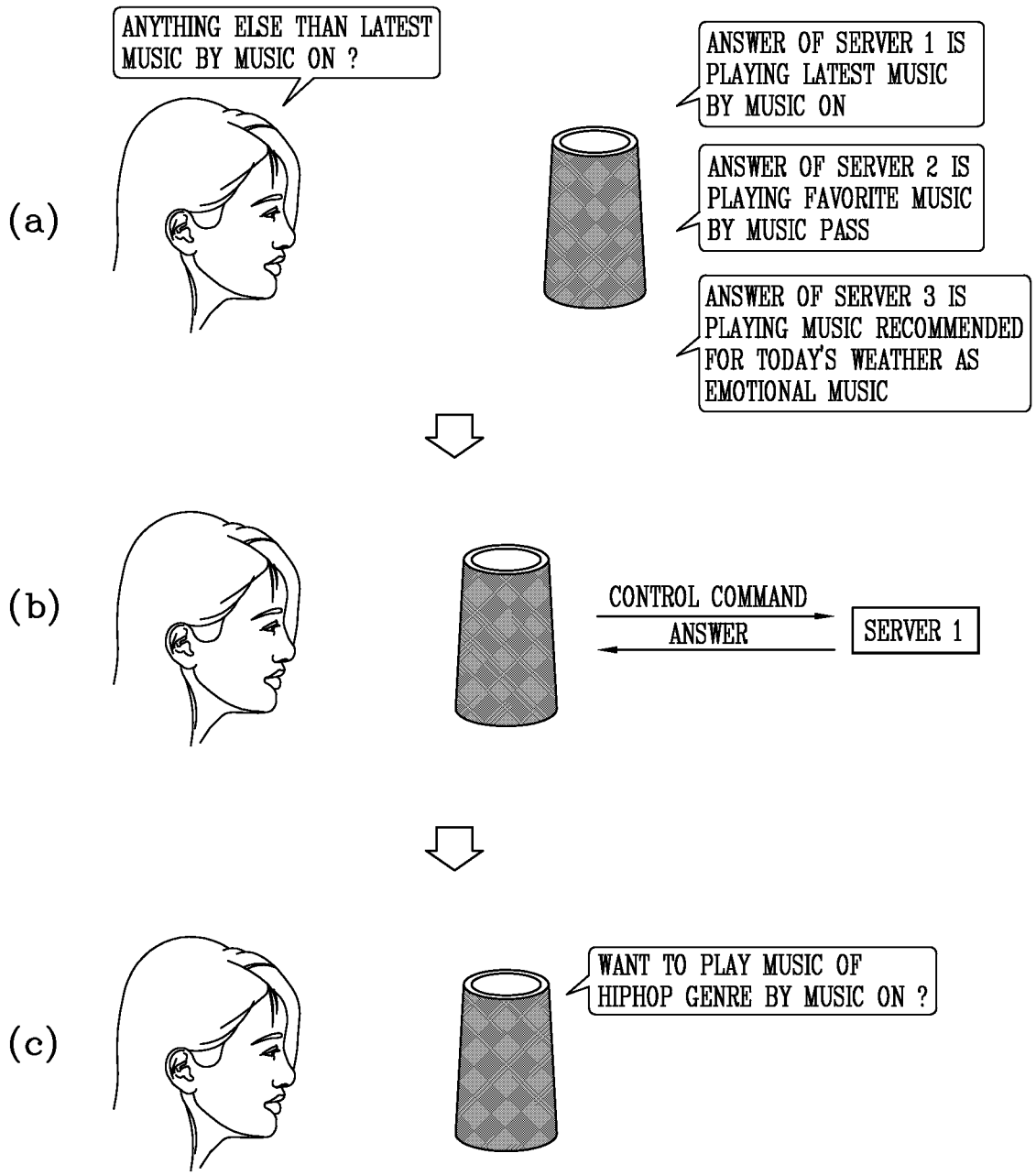
FIG. 14 is a conceptual view illustrating an embodiment of the operation of FIG. 13.

Referring to (a) of FIG. 14, after the pieces of result information received from the server 1, server 2, and server 3 are sequentially output, the controller 180 may receive a new control command from the user. The new control command may be received by voice.

Here, the controller 180 may determine whether the user's control command is related to the plurality of pieces of result information (S1330).

When the user's control command is related to any one of the plurality of pieces of result information, the controller 180 may transmit the user's control command to the artificial intelligence server which has transmitted the any one result information (S1340).

Referring to (b) of FIG. 14, after the plurality of pieces of result information are output, the controller 180 may receive a control command related to the server 1. The control command related to the server 1 may be a control command including a word included in the result information transmitted from the server 1 or a word indicating identification information of the server 1. For example, in a state in which result information of the server 1 is "latest music is played by music ON (music program)", when a user's new control command of "any other one than the latest one by music ON?" is received by voice, the controller 180 may determine the user's new control command as a command related to the result information of the server 1.

Here, although the user's new control command does not include a starting word of the server 1, the controller 180 may transmit the user's new control command only to the server 1. Also, the controller 180 may not transmit the user's new control command to the server 2 and the server 3.

Referring to (c) OF FIG. 14, the controller 180 may output a new answer received from the server 1. Thus, in the present disclosure, although the user does not know a starting word of the artificial intelligence server preferred by the user, the user may perform communication with his preferred artificial intelligence server. Also, in the present disclosure, unnecessary communication with the server 2 and server 3 may not be performed.

Meanwhile, when the user's control command is not related to the plurality of pieces of result information, the controller 180 may transmit the new control command to the plurality of artificial intelligence servers (S1350).

The user's control command may not be related to the plurality of pieces of result information. Here, the controller 180 may transmit the user's control command to the plurality of artificial intelligence servers.

Or, although not shown, when the user's control command is not related to the plurality of pieces of result information, the controller 180 may disregard the user's control command and switch the voice recognition state 220 to the standby state 210. Here, the voice recognition function of the electronic device may be terminated.

In the above, the operation of the electronic device which processes the additional user's control command has been described.

Figure 15:
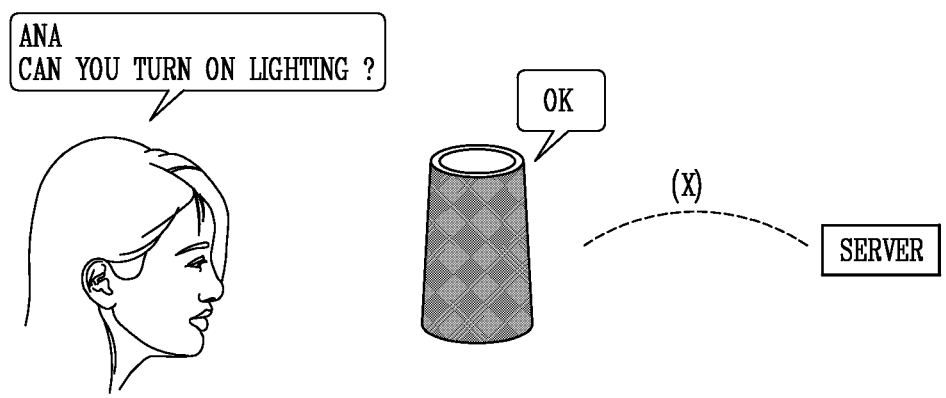
FIG. 15 is a conceptual view illustrating an embodiment of an operation method of an electronic device which does not communicate with a plurality of artificial intelligence servers.

Hereinafter, an operating method of the electronic device which does not communicate with a plurality of artificial intelligence servers will be described. FIG. 15 is a conceptual view illustrating an embodiment of an operation method of an electronic device which does not communicate with a plurality of artificial intelligence servers.

The electronic device 100 according to the present disclosure may perform an artificial intelligence server positioned outside through an external network or may perform communication with a device included in an internal network through an internal network. Here, the external network refers to a remote communication network such as Wi-Fi, or the like, and the internal network refers to a short-range communication network following the standard such as DLNA or IFTTT. The internal network may be a communication network between electronic devices positioned in a limited space such as a house, or the like.

The case in which the electronic device 100 operates to communicate with the artificial intelligence server positioned outside through the external network may be termed an overall operation mode, and the case in which the electronic device 100 operates through the internal network may be termed a local operation mode. In the above descriptions, it is assumed that the electronic device 100 operates in the overall operation mode.

Hereinafter, the local operation mode will be described in detail.

When a voice is received from the user, the controller 180 may analyze the voice information and determine whether to operate in any one of the overall operation mode and the local operation mode.

When it is determined that the voice information is information which does not require receiving of result information from an artificial intelligence server, the controller 180 may operate the electronic device in the local operation mode. Here, the controller 180 may operate the electronic device 100 on the basis of the voice information, without transmitting the voice information to the artificial intelligence server. For example, referring to FIG. 15, when a voice of "ANA, can you turn on lighting?" is received, the controller 180 may operate the electronic device in the local operation mode on the basis of voice information corresponding to the voice. Also, although not shown, the controller 180 may transmit a control command to a lighting device to turn on lighting which can communicate by the internal network.

In this manner, in the present disclosure, with respect to a control command not requiring communication with the artificial intelligence server, the electronic device may more quickly respond and operate.

In the present disclosure, through communication with a plurality of artificial intelligence servers, a plurality of pieces of result information processed using the artificial intelligence technology may be obtained. Thus, in the present disclosure, a plurality of pieces of result information processed using the artificial intelligence technology may be provided to the user and the user may check result information with highest accuracy, among the plurality of pieces of result information.

Also, in the present disclosure, with respect to the plurality of artificial intelligence servers set to be activated through mutually different starting words, since the plurality of artificial intelligence servers are simultaneously activated using one starting word, convenience of the user who uses the artificial intelligence servers may be enhanced.

Also, in the present disclosure, using an answer reaction of the user with respect to result information received from the plurality of artificial intelligence servers, an evaluation score of the user regarding the result information of each server may be calculated, priority levels of the plurality of artificial intelligence servers may be set on the basis of the calculated evaluation information, and the plurality of pieces of result information may be sequentially provided according to the priority levels. Thus, in the present disclosure, the user may be preferentially provided with result information with high user preference.

The present invention described above may be implemented as a computer-readable code in a medium in which a program is recorded. The computer-readable medium includes any type of recording device in which data that can be read by a computer system is stored. The computer-readable medium may be, for example, a hard disk drive (HDD), a solid state disk (SSD), a silicon disk drive (SDD), a ROM, a RAM, a CD-ROM, a magnetic tape, a floppy disk, an optical data storage device, and the like. The computer-readable medium also includes implementations in the form of carrier waves (e.g., transmission via the Internet). Also, the computer may include the controller 180 of the terminal. Thus, the foregoing detailed description should not be interpreted limitedly in every aspect and should be considered to be illustrative. The scope of the present invention should be determined by reasonable interpretations of the attached claims and every modification within the equivalent range are included in the scope of the present invention.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. An electronic device comprising:
an audio receiver;
a wireless communication unit; and
a controller configured to:
register a plurality of artificial intelligence servers, the registration comprising:
searching for available artificial intelligence servers;
transmitting a question list to each of the plurality of artificial intelligence servers;
receiving answer information from each of the plurality of artificial intelligence servers in response to the question list;
calculating an evaluation score for each of the plurality of artificial intelligence servers based on the answer information;
determining a priority level for each of the plurality of artificial intelligence servers based on the calculated evaluation scores; and
when a positive answer with respect to the answer information is sensed, raising the evaluation score for each of the plurality of artificial intelligence servers,
wherein the controller is further configured to:
receive a voice input via the audio receiver;

when the voice input is determined to include a starting word corresponding to a specific artificial intelligence server of the plurality of artificial intelligence servers, transmit, via the wireless communication unit, the starting word and a command corresponding to the voice input to the specific artificial intelligence server; and when the voice input is determined not to include a starting word corresponding to the specific AI server but includes a preset starting word, convert the preset starting word into different starting words corresponding to each of the plurality of artificial intelligence servers and transmit, via the wireless communication unit, a corresponding converted starting word and the command corresponding to the voice input to each of the plurality of artificial intelligence servers;

receive a plurality of responses from the plurality of artificial intelligence servers in response to the command corresponding to the voice input; and output information from one or more of the received plurality of responses.

2. The electronic device of claim 1, wherein the controller is further configured to:
search for available artificial intelligence servers; and
generate a network node corresponding to each of the plurality of artificial intelligence servers identified from the search for communicating with the plurality of artificial intelligence servers.

3. The electronic device of claim 2, wherein
the controller is further configured to receive starting words and registration information for each of the plurality of artificial intelligence servers; and
register a corresponding received starting word and registration information in the communication node of each server of the plurality of artificial intelligence servers.

4. The electronic device of claim 1, wherein the one or more responses are output in an order according to the determined priority levels.

5. The electronic device of claim 1, wherein the controller is further configured to calculate an evaluation score of a corresponding artificial intelligence server based on whether the answer information is determined to be positive or negative.

6. The electronic device of claim 5, wherein the controller is further configured to:
determine that the answer information is an ambiguous answer when the answer information is neither positive nor negative; and
store a number of times that the corresponding artificial intelligence server has transmitted an ambiguous answer.

7. The electronic device of claim 6, wherein when two artificial intelligence servers have a same evaluation score, the controller is further configured to set a higher priority for an artificial intelligence server having a lower number of ambiguous answers.

8. The electronic device of claim 1, wherein the controller is further configured to:
receive an additional voice input via the audio receiver;
determine whether the additional voice input is related to the one or more output responses; and
update an evaluation score for an artificial intelligence server of the plurality of artificial intelligence servers based on the additional voice input when the additional voice input is related to the one or more output responses.

9. The electronic device of claim 8, wherein the controller is further configured to terminate a voice recognition function when the additional voice input is not related to the one or more output responses.

10. The electronic device of claim 1, wherein:
the one or more output responses are received from one or more artificial intelligence servers having a high priority level; and
the controller is further configured to output additional responses received from artificial intelligence servers not having a high priority level in response to a control command for outputting remaining received responses.

11. The electronic device of claim 1, wherein the controller is further configured to:
receive, via the audio receiver, an additional voice input related to the one or more output responses; and
transmit voice information corresponding to the additional voice input to only an artificial intelligence server which provided the one or more output responses.

12. The electronic device of claim 1, wherein the controller is further configured to output identification information of each artificial intelligence server corresponding to each of the one or more output responses.

13. The electronic device of claim 1, wherein the output information comprises all of the received plurality of responses output in an order corresponding to preset priority levels of the plurality of artificial intelligence servers.

14. The electronic device of claim 1, wherein the output information comprises one of the received plurality of responses corresponding to a highest priority level artificial intelligence server.

15. A method for controlling an electronic device communicating with a plurality of artificial intelligence servers, the method comprising:
registering a plurality of artificial intelligence servers, the registration comprising:
searching for available artificial intelligence servers;
transmitting a question list to each of the plurality of artificial intelligence servers;
receiving answer information from each of the plurality of artificial intelligence servers in response to the question list;
calculating an evaluation score for each of the plurality of artificial intelligence servers based on the answer information; and
determining a priority level for each of the plurality of artificial intelligence servers based on the calculated evaluation scores,
wherein the method further comprises:
receiving a voice input via an audio receiver;
when the voice input is determined to include a starting word corresponding to a specific artificial intelligence server of the plurality of artificial intelligence servers, transmitting the starting word and a command corresponding to the voice input to the specific artificial intelligence server; and
when the voice input is determined not to include a starting word corresponding to the specific AI server but includes a preset starting word, converting the preset starting word into different starting words corresponding to each of a plurality of artificial intelligence servers and transmitting a corresponding converted starting word and the command corresponding to the voice input to each of the plurality of artificial intelligence servers;
receiving a plurality of responses from the plurality of artificial intelligence servers in response to the command corresponding to the voice input; and
outputting information from one or more of the received plurality of responses.

16. The method of claim 15, further comprising:
searching for available artificial intelligence servers; and
generating a network node corresponding to each of the plurality of artificial intelligence servers identified from the search for communicating with the plurality of artificial intelligence servers.

17. The method of claim 15, wherein the one or more responses are output in an order according to the determined priority levels.

18. The method of claim 15, wherein the output information comprises all of the received plurality of responses output in an order corresponding to preset priority levels of the plurality of artificial intelligence servers.

19. The method of claim 15, wherein the output information comprises one of the received plurality of responses corresponding to a highest priority level artificial intelligence server.

* * * * *